United States Patent [19]

Kaizaki et al.

[11] Patent Number: 5,384,600
[45] Date of Patent: Jan. 24, 1995

[54] SYSTEM AND METHOD FOR CONVERTING VIDEO SIGNALS FOR DISPLAY ON TELEVISION RECEIVER SCREENS OF DIFFERING ASPECT RATIOS

[75] Inventors: Kazuhiro Kaizaki, Odawara; Masako Kamimura, Fujisawa; Takaaki Matono; Sadao Kubota, both of Yokohama, all of Japan

[73] Assignee: Hitachi, Ltd., Tokyo, Japan

[21] Appl. No.: 179,036

[22] Filed: Jan. 6, 1994

[30] Foreign Application Priority Data

Jan. 11, 1993 [JP] Japan .................................. 5-002633

[51] Int. Cl.⁶ .............................................. H04N 5/262
[52] U.S. Cl. .................................... 348/556; 348/445
[58] Field of Search ................ 348/555, 556, 557, 445; H04N 5/262, 5/272

[56] References Cited

U.S. PATENT DOCUMENTS 5,132,793 7/1992 Hirahata et al. ..................... 348/556
5,146,331 9/1992 Tsuchida ............................. 348/556

FOREIGN PATENT DOCUMENTS

314873 5/1989 European Pat. Off.
447167 9/1991 European Pat. Off.

Primary Examiner—Victor R. Kostak
Attorney, Agent, or Firm—Gerald E. Lester; Gordon T. Arnold; Bruce W. Slaydon, II

[57] ABSTRACT

A television receiver which can display images in different displaying forms on a display screen with an aspect ratio of 16:9 by controlling the video chroma processing circuit by the micro computer by operating the remote controlled signal acceptor or the key switch has memories. The first memory stores video control data for each displaying form and the second memory stores appointed data for designating predetermined video control data. When the displaying form is changed by operating the remote controlled signal acceptor or the key switch, the micro computer reads the video control data corresponding to the displaying form which is newly set from the first memory according to the appointed data of the second memory and changes, for example, the contrast characteristic in the signal processing circuit according to the read data. By doing this, in the television receiver which is applicable to both a high quality television system and the conventional television system, when displaying images of conventional television signals in different displaying forms on a display screen with an aspect ratio of 16:9, the most suitable image quality can be obtained for each displaying form.

7 Claims, 9 Drawing Sheets

| MEMORY NUMBER | VIDEO CONTROL DATA |
|---|---|
| 1 | CONTRAST 1 = 100 |
| 1 | SHARPNESS 1 = 100 |
| 2 | CONTRAST 2 = 50 |
| 2 | SHARPNESS 2 = 50 |

FIG. 2(b)

| DISPLAYING FORM INFORMATION | APPOINTED DATA |
|---|---|
| 0 (FIG. 5(b)) | 0 (=MEMORY NUMBER 2) |
| 1 (FIG. 5(c)) | 1 (=MEMORY NUMBER 1) |

SYSTEM AND METHOD FOR CONVERTING VIDEO SIGNALS FOR DISPLAY ON TELEVISION RECEIVER SCREENS OF DIFFERING ASPECT RATIOS

BACKGROUND OF THE INVENTION

The present invention relates to a television receiver for receiving conventional television signals of the NTSC system or PAL system or high-quality television signals such as multiple sub-nyquist sampling encoding (MUSE).

As the high-quality television system with an aspect ratio of 16:9 has come into wide use, various examinations have been made for compatibility with the standard television system which is the conventional NTSC system.

Figure 5A:
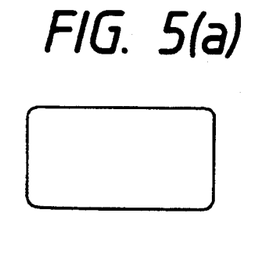
FIGS. 5A-5E are illustrations showing examples of the display method for images of NTSC signals on a display screen with an aspect ratio of 16:9.
Figure 5B:
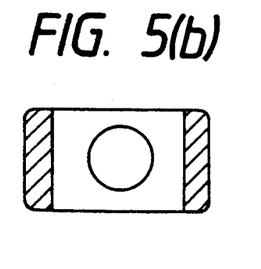

When an image by a video signal with an aspect ratio of 4:3 is displayed as it is on a display screen with an aspect ratio of 16:9, for example, a circle is displayed as an ellipse which is long sideways as shown in FIG. 5(a). Therefore, the video signal is generally processed so that the image is compressed horizontally as shown in FIG. 5(b), and the image is displayed with a side blank signal inserted on both left and right sides.

Figure 5C:
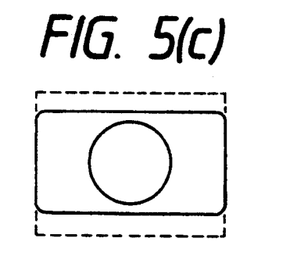

According to this display method, however, there are parts with no image displayed on both sides of the display screen, and the wide screen with an aspect ratio of 16:9 is not used effectively. Therefore, a technique for enlarging and displaying an image vertically as shown in FIG. 5(c) by processing a video signal with an aspect ratio of 4:3, and for using the display screen effectively is indicated. An example of a conventional television receiver of the NTSC system for obtaining such an image will be explained with reference to FIG. 6. In the figure, numeral 1 indicates a UHF/VHF antenna, 2 a UHF/VHF tuner (hereinafter called a front end (FE)) including an interface circuit, 3 an NTSC decoder, 4 a conversion circuit for display area or picture converter, 5 a signal processing circuit, 6 a cathode-ray tube, 7 a micro computer, 8 a remote controlled signal acceptor, 9 a key switch, and 10 a video chroma processing circuit.

Figure 6:
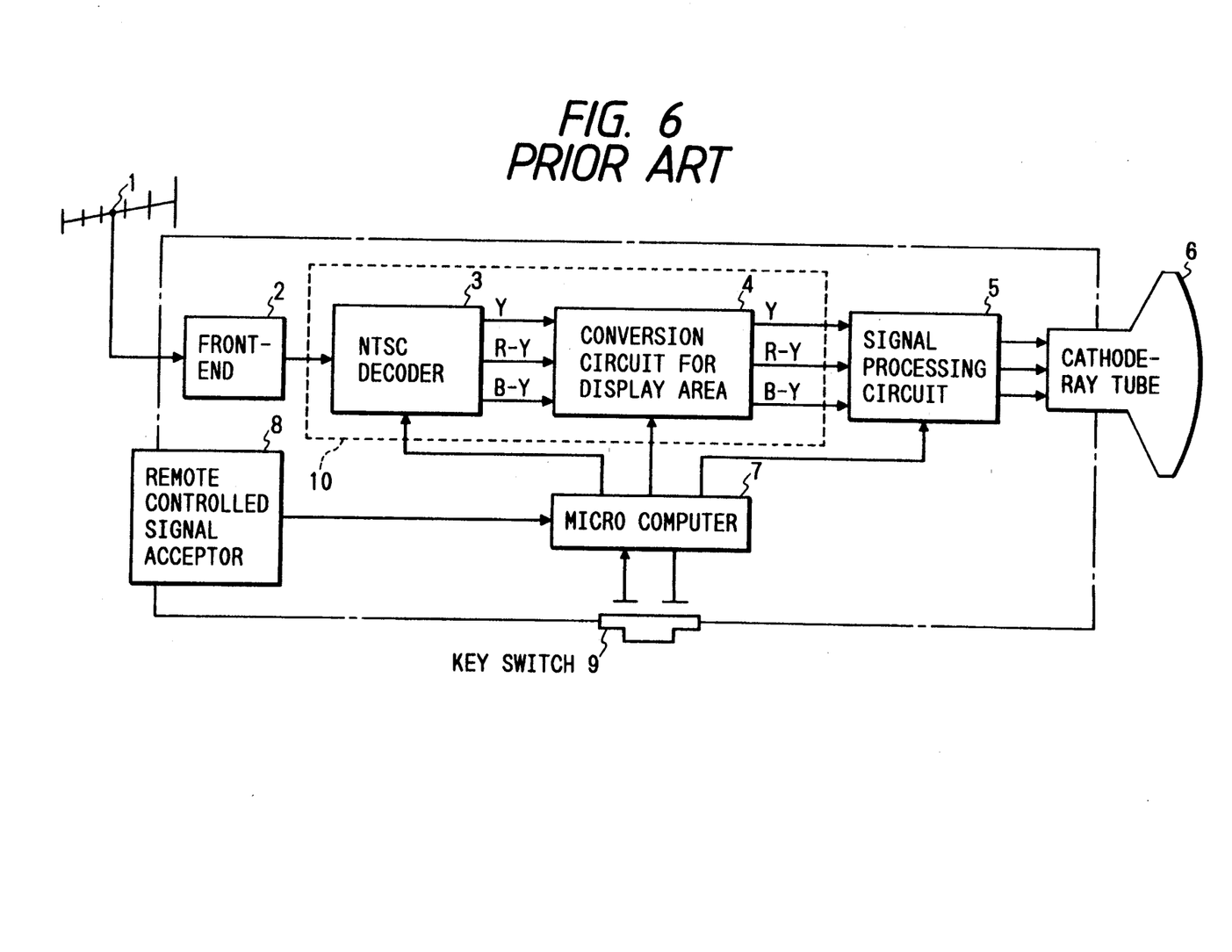
FIG. 6 is a block diagram showing an example of conventional television receivers.

In FIG. 6, the aspect ratio of the display screen of the cathode-ray tube 6 is 16:9. Assuming that the front end 2 is set so as to select video signals of the NTSC system (hereinafter called NTSC signals) among received signals from the antenna 1, the NTSC signals are supplied to the video chroma processing circuit 10. This video chroma processing circuit 10 consists of the NTSC decoder 3 and picture converter 4, and the NTSC decoder 3 and picture converter 4 change their operations according to instructions from the remote controlled signal acceptor 8 or the key switch 9 of the keyboard via the micro computer 7.

Upon reception of an instruction to receive NTSC signals from the remote controlled signal acceptor 8 or the key switch 9, the front end 2 operates so as to select NTSC signals as mentioned above, and the NTSC decoder 3 operates so as to decode supplied NTSC signals. By doing this, in the NTSC decoder 3, NTSC signals are decoded and luminance signals Y and chrominance signals R-Y and B-Y are outputted and supplied to the picture converter 4. In response to an instruction from the remote controlled signal acceptor 8 or the key switch 9 the picture converter 4 processes the luminance signals Y and chrominance signals R-Y and B-Y as described below to display images by one of the methods shown in FIGS. 5(b) and 5(c) under the control of the micro computer 7. The output of circuit 10 is applied to the signal processing circuit 5 shown in FIG. 6. The signal processing circuit 5 processes the luminance signals Y and chrominance signals R-Y and B-Y so as to generate primary color signals, which are supplied to the cathode-ray tube 6 of FIG. 6. By doing this, on the display screen of the cathode-ray tube 6, an image of NTSC signals is displayed as shown in FIG. 5(b) or 5(c).

When high-quality television signals with an aspect ratio of 16:9 are received, video signals outputted from the front end 2 if FIG. 6 are processed by another video chroma processing circuit which is not shown in the drawing. The output of this other video chroma processing circuit is supplied to the signal processing circuit 5 shown in FIG. 6.

The picture converter 4 of FIG. 6 is a main part of the video signal processing for displaying images as explained in the description of FIG. 5.

Figure 7:
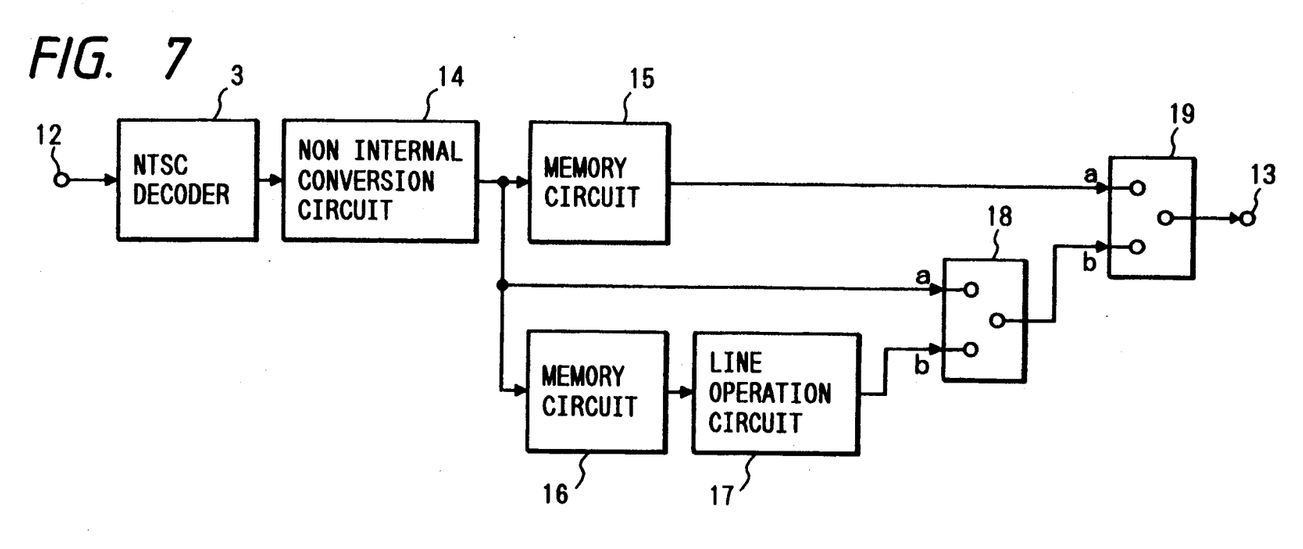
FIG. 7 is a block diagram showing an example of the picture converter of FIG. 6.

FIG. 7 is a block diagram showing the video chroma processing circuit 10 of FIG. 6, which consists of the NTSC decoder 3 of FIG. 6, and the picture converter 4.

In the FIG. 7, reference number 12 indicates an input terminal, 13 an output terminal, 14 a non-interlace converting circuit, 15 and 16 memory circuits, 17 a digital interpolation filter, and 18 and 19 selection circuits. NTSC signals are inputted from the input terminal 12 and supplied to the NTSC decoder 3 of FIG. 7 so as to be converted to luminance signals and chrominance signals. These signals are converted to non-interlace signals by the non-interlace conversion circuit 14 and are scanned sequentially. Output signals of the non-interlace conversion circuit 14 are supplied to the memory circuits 15 and 16 and to the "a" side of the selection circuit 18 (switch).

When displaying an image of an aspect ratio of 4:3 by inserting side blank signals on the left and right sides of the display screen as shown in FIG. 5(b), the "a" side of the selection circuit 19 of FIG. 7 is closed and an output signal from the non-interlace conversion circuit 14 of FIG. 7 is processed by the memory circuit 15 and supplied to the signal processing circuit 5 of FIG. 6 from the output terminal 13. In this case, the memory circuit 15 of FIG. 7 makes the frequency of the read clock frequency higher than the frequency of the write clock, and compresses the time base of a video signal so that the period of the video section during each horizontal scanning period of the video signal is shortened. By doing this, the image display shown in FIG. 5(b) is made possible.

Figure 5D:
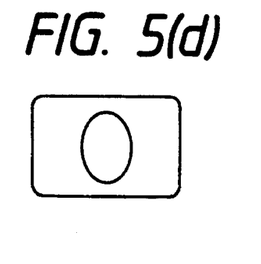
Figure 5E:
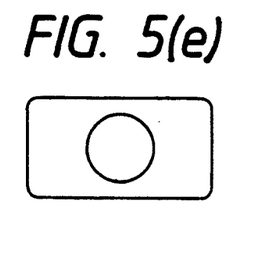

If a video signal which is an NTSC signal in which the aspect ratio is 16:9, an image is compressed horizontally so that, for example, an image which is circular originally is displayed as an ellipse which is longer than it is wide as shown in FIG. 5(d). In the case of such a video signal, the selection circuit 18 (switch) of FIG. 7 is closed on the "a" side, and the selection circuit 19 (switch) of FIG. 7 is closed on the "b" side, and an output signal of the non-interlace conversion circuit 14 of FIG. 7 which is generated and supplied to the signal processing circuit 5 of FIG. 6 by way of the output terminal 13. By doing this, as shown in FIG. 5(e), an image which is precisely shaped is displayed on a screen with an aspect ratio of 16:9.

Furthermore, when displaying an image on a display screen with an aspect ratio of 16:9 as shown in FIG. 5(c)

using a general NTSC signal, the selection circuits 18 and 19 (switches) shown in FIG. 7 are both closed on the "b" side, and the memory circuit 16 having a large capacity is used. In this case, such an NTSC signal image is separated (extracted) by removing the upper and lower parts, and the remaining part is enlarged in the perpendicular or vertical direction. In the memory circuit 16 of FIG. 7, the picture area indicated by the NTSC signal is set as shown in FIG. 5(c) and the time base is corrected so that the solid line part in this picture area is separated for each screen of the video signal and enlarged perpendicularly or vertically. Although the number of lines (the number of horizontal scanning lines) is reduced by this separation, the reduced lines are interpolated by the digital interpolation filter 17 of FIG. 7. The video signal which is processed like this is supplied to the signal processing circuit 5 of FIG. 6 from the output terminal 13 via the selection circuits 18 and 19 of FIG. 7.

The aforementioned processing circuit consisting of the noninterlace converting circuit 14 and memory circuits 15 and 16 of FIG. 7 is provided for each luminance signal Y and chrominance signals R-Y and B-Y, and each signal is processed as mentioned above.

Figure 8:
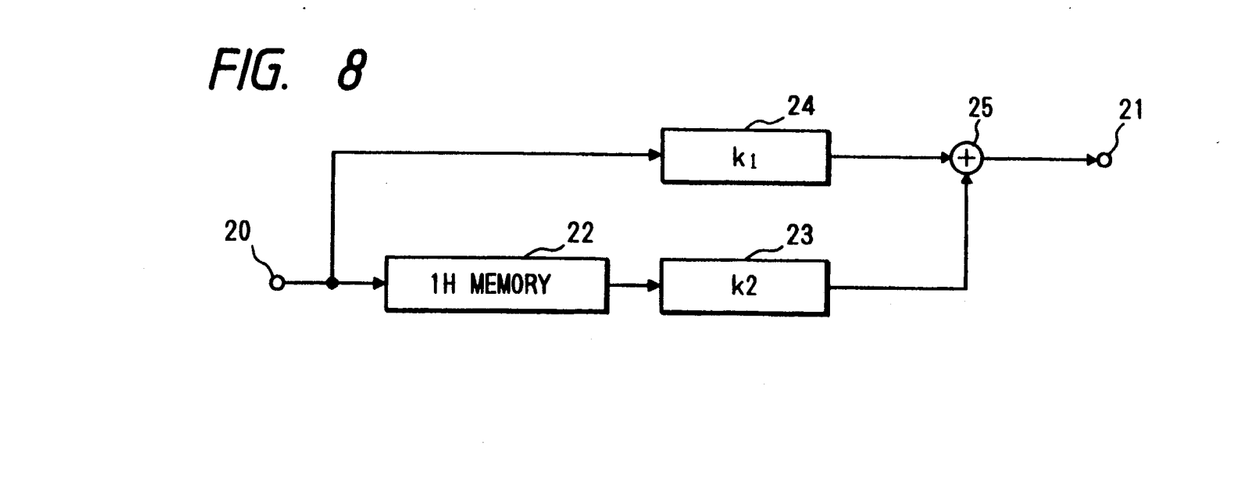
FIG. 8 is a block diagram showing an example of the digital interpolation filter of FIG. 7.

FIG. 8 is a block diagram showing the concrete configuration of the digital interpolation filter 17 of FIG. 7. In the drawing, number 20 indicates an input terminal of video signals from the memory circuit 16 of FIG. 7, 21 an output terminal, 22 "a" line delay memory, 23 and 24 multipliers of input signals, and 25 an adder.

Next, the operation of the digital interpolation filter 17 of FIG. 7 will be explained in detail with reference to FIG. 9.

Figure 9:
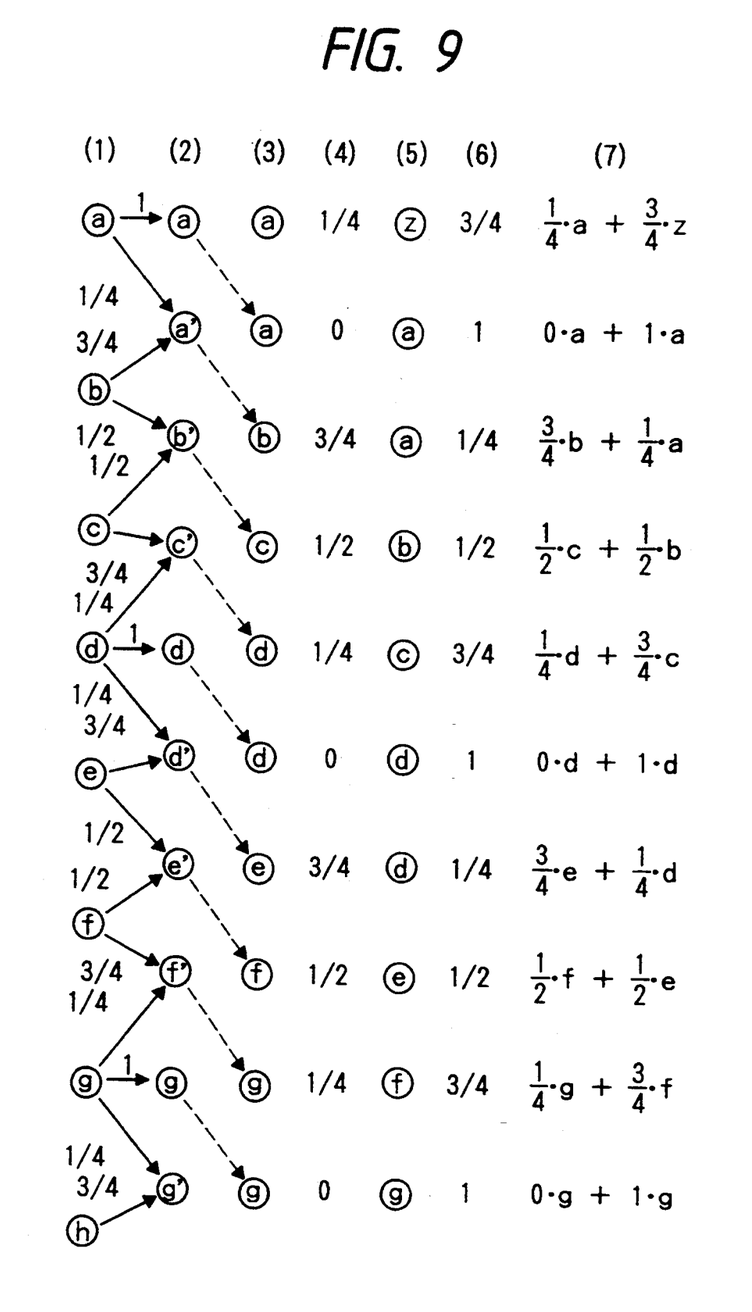
FIG. 9 is a drawing showing the line interpolation of the digital interpolation filter of FIG. 8.

(1) shown in FIG. 9 indicates sequential lines (a), (b), - - - in the aforementioned picture area in the memory circuit 16 of FIG. 7 and (2) shown in FIG. 9 indicates lines (a), (a'), (b'), - - - of video signals outputted from the digital interpolation filter 17 of FIG. 7 which are line-interpolated, enlarged, and outputted. To prevent an image by the video signal obtained by this line interpolation from an unnatural image, the center of gravity of each of the dashed code lines such as lines a ' and (b') is shifted vertically sequentially. In this drawing, an example of enlargement of 4/3 times is shown. Therefore, the center of gravity is shifted in units of $\frac{1}{4}$. Between (1) of FIG. 9 and (2) of FIG. 9, interpolation tap coefficients are shown so as to set the aforementioned centers of gravity. The drawing shows that, for example, the line (a') can be obtained by adding the line (a) which is multiplied by a tap coefficient of $\frac{1}{4}$ to the line (b) which is multiplied by a tap coefficient of $\frac{3}{4}$.

In the case of enlargement of 4/3 times as mentioned above, an enlarged video signal (for (1) as shown in FIG. 9) consisting of the lines in FIG. 9 can be generated by filtering of comparatively simple coefficients. This will be explained hereunder.

(3) shown in FIG. 9 indicates sequential lines which are inputted into the input terminal 20 of FIG. 8. The memory circuit 16 of FIG. 7 assumes the above picture area as a part of $\frac{3}{4}$ of the original screen and reads the lines within this range sequentially, though it reads the same line repeatedly two times at every third line. In (3) shown in FIG. 9, for example, the line (a) is read two times, and the line (b) and line (c) are read once next, and then the line (d) is read two times. By doing this, one line is increased for each three lines and the number of lines on the entire screen becomes the regular number (for example, of the NTSC system). (4) shown in FIG. 8 indicates coefficients $k_1$ of the multiplier 24 by which video signals of lines which are inputted from the input terminal 20 of FIG. 8 are multiplied. (5) shown in FIG. 9 indicates lines which are outputted from the line memory 22 ((3) of FIG. 9 is delayed) to which lines from the input terminal 20 of FIG. 8 are supplied. (6) of FIG. 9 indicates coefficients $k_2$ of the multiplier 23 for lines outputted from the line memory 22 of FIG. 8. (7) shown in FIG. 9 indicates output signals from the adder 25.

The vertical enlarging process of each line shown in (2) of FIG. 9, is the process indicated by (3) to (7) of FIG. 9, which are indicated by a dotted line arrow. For example, the line (a') is obtained by adding the line (b) which is inputted from the input terminal 20 and multiplied by a coefficient of $\frac{3}{4}$ by the multiplier 24 to the line (a), which is inputted from the input terminal 20 previously, outputted from the line memory 22, and multiplied by a coefficient of $\frac{1}{4}$ by the multiplier 23 by the adder 25. The coefficients $k_1$ and $k_2$ of the multipliers 23 and 24 are changed sequentially for each line, and the centers of gravity of four lines consisting of three lines are not one-sided and uniform.

As mentioned above, this conventional example is advised so as to display a video signal with an aspect ratio of 4:3 effectively on a display screen with an aspect ratio of 16:9.

According to the above prior art, however, when displaying, for example, an image of a video signal with an aspect ratio of 4:3 on a display screen with an aspect ratio of 16:9, the display shown in FIG. 5(b) and the display shown in FIG. 5(c) can be changed. In this case, the image is enlarged and displayed as showed in FIG. 5(c) by using the memory circuit 16 and digital interpolation filter 17 of FIG. 7. An image which is displayed without being enlarged is shown in FIG. 5(b), where the contrast and sharpness are lost, and the image is apt to be seen as an image which is not modulated, and in which the image quality is changed. Therefore, to obtain a most suitable image quality in either of the image display modes shown in FIGS. 5(b) and 5(c), it is necessary to let the micro computer 7 of FIG. 6 control the signal processing circuit 5 of FIG. 6 by operating the key switch 9 or the remote controlled signal acceptor to change the display mode and to readjust the video control data such as the sharpness and contrast. It is not easy to operate the receiver, and when the display mode is changed, a sense of incompatibility may be caused due to a change in the image quality.

SUMMARY OF THE INVENTION

An object of the present invention is to provide a television receiver that can display images in a most suitable image quality when enlarging and displaying them efficiently on a display screen with a different aspect ratio, and that can be operated easily.

To accomplish the above object, a television receiver in accordance with the present invention can display images of standard type television signals with an aspect ratio of 4:3 on a screen, even though the screen has an aspect ratio which is not 4:3. For each of a number of different aspect ratios, a video control data group is stored in a first memory means of video control data for specifying the image quality including the brightness, white balance, and sharpness for images of standard type television signals which are displayed on the screen. A second memory means is used to store group identification data for identifying the video control data group corresponding to each aspect ratio of the images of standard type television signals which are displayed on the screen. A control means communicates with the first and second memory means to change the aspect ratio of the images of standard type television signals which are displayed on the screen, to read the group identification data corresponding to the aspect ratio which is set by this changing from the second memory means, to read the video control data group designated by the group identification data from the first memory means, and to control the signal processing circuit according to the video control data. By doing this, in link motion with changing of the aspect ratio of an image to be displayed, video control data such as the sharpness and contrast which are most suited to the display at that time are automatically selected. Therefore, the most suitable image quality can be obtained always and the receiver can be operated easily.

DESCRIPTION OF THE PREFERRED EMBODIMENT

Next, the embodiment of the present invention will be explained with reference to the accompanying drawings.

Figure 1:
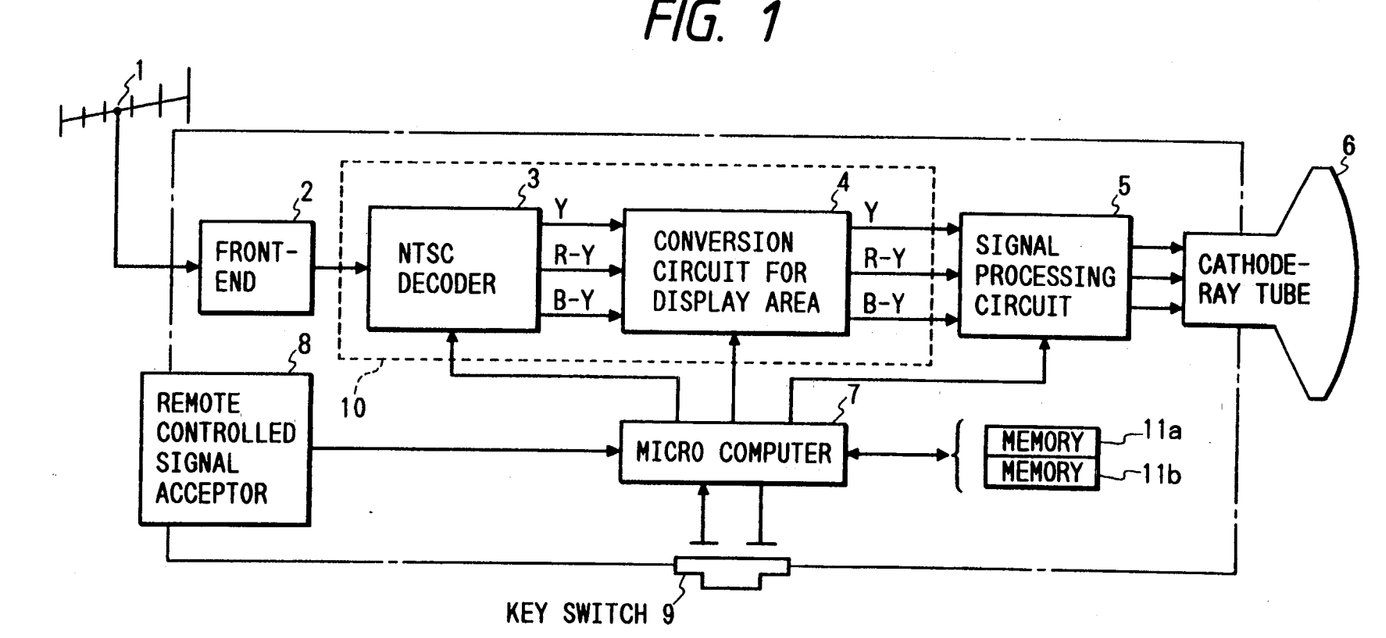
FIG. 1 is a block diagram showing an embodiment of the television receiver of the present invention.

FIG. 1 is a block diagram showing an embodiment of the television receiver of the present invention. In the drawing, numerals 11a and 11b indicate memories. The same numeral is assigned to each of the parts corresponding to FIG. 6 which shows a conventional example so as to omit duplicate explanation and the numerals which are shown hereinafter are those shown in FIG. 1 unless otherwise specified.

In the drawing, it is assumed that either of the methods shown in FIGS. 5(b) and 5(c) can be selected as an image display method on a cathode-ray tube 6 when an NTSC signal with an aspect ratio of 4:3 is received.

A micro computer 7 is equipped with the memories 11a and 11b. These memories 11a and 11b are memories which can write data in an electrically erasable and programmable read only memory (E$^2$PROM). A group of data (video control data) for determining the image quality such as the sharpness and contrast of images for each image display method shown in FIGS. 5(b) and 5(c) is stored in the memory 11a. Group identification data for setting such an image display method and also designating the video control data group corresponding to the setting is stored in the memory 11b.

Figure 2A:
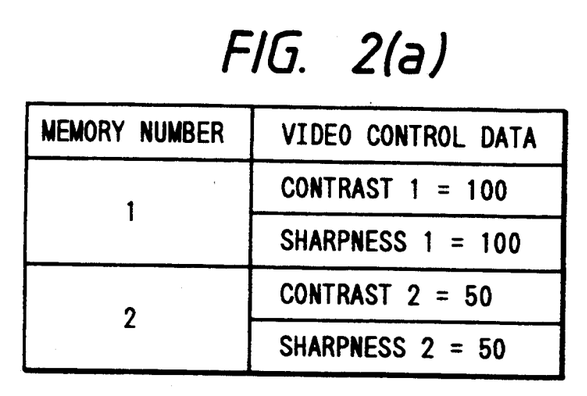
FIGS. 2A and 2B are drawings showing an actual example of memory contents of the memories shown in FIG. 1.

FIG. 2(a) shows an example of memory contents of the memory 11a. In the drawing, the two types of image display methods shown in FIGS. 5(b) and 5(c) are used. Therefore, the memory contents are video control data of memory number 1 and video control data of memory number 2 in correspondence to them. In this example, it is assumed that the first video control data is contrast 1=100 and sharpness 1=100 and the second video control data is contrast 2=50 and sharpness 2=50.

Figure 2B:
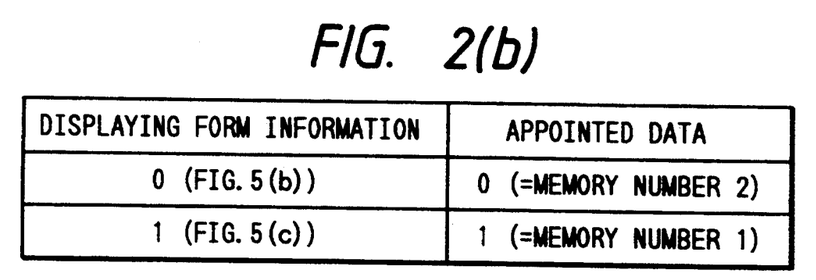

FIG. 2(b) shows an example of memory contents of the memory 11b. In this memory, the displaying forms shown in FIGS. 5(b) and 5(c) and identification data for designating the video control data in the memory 11a which corresponds to the displaying forms. Information of the displaying forms is inputted from the remote controlled signal acceptor 8 or the key switch 9 shown in FIG. 1. In this example, it is assumed that the information of the displaying form shown in FIG. 5(c) is 0 and the information of the displaying form shown in FIG. 5(b) is 1. It is also assumed that identification data of 0 designates the first video control data of memory number 1 shown in FIG. 2(a) and identification data of 1 designates the second video control data of memory number 2 shown in FIG. 2(a).

Such information is written into the memories 11a and 11b by operating the remote controlled signal acceptor or the key switch 9 under the control of the micro computer 7. Next, the above method will be explained with reference to FIG. 3.

Figure 3A:
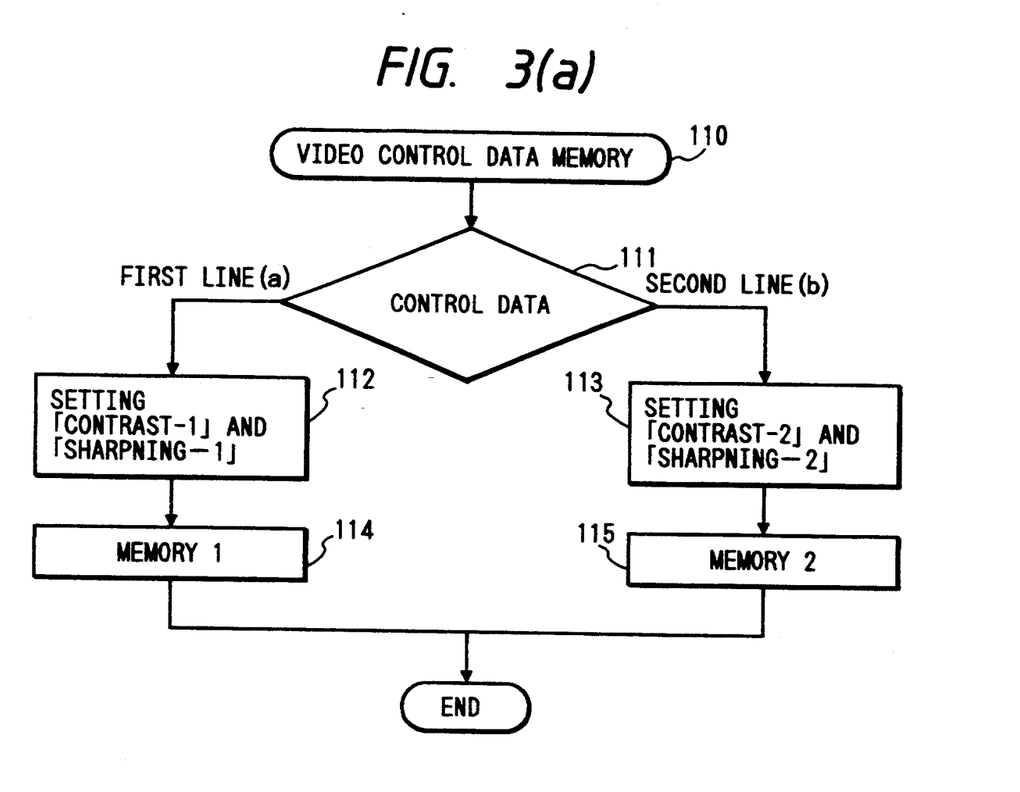
FIGS. 3A-3C are flow charts showing information writing and reading operations in the memories shown in FIG. 1.

First, the method of writing video control data into the memory 11a will be explained with reference to FIG. 3(a) and FIG. 1.

When the video control data writing mode is selected by operating the remote controlled signal acceptor 8 or the key switch 9 of FIG. 1, selection of the first video control data group or the second video control data group occurs under the control of the microcomputer 7. The selected video control data is displayed on the cathode-ray tube 6 (Step 111 shown in FIG. 3(a)). When, for example, "First Line (a)" shown in FIG. 3(a) is selected by operating the remote controlled signal acceptor 8 or the key switch 9 of FIG. 1, the values of "CONTRAST-1" and "SHARPNESS- 1" of an image at Step 112 of FIG. 3(a) are written into memory 11a of FIG. 1. By way of a further example, the video control data for the image display form shown in FIG. 5(c) is written into memory 11a by operating the remote controlled signal acceptor 8 or the key switch 9. The most suitable values of "CONTRAST-1" and "SHARPENING-1" are determined at Step 112. A memory instruction operation then is performed, and the values are stored in the memory 11a at Step 114. By doing this, as shown in FIG. 2(a) for example, "CONTRAST 1"=100 and "SHARPNESS 1"=100 shown in FIG. 2 are stored in the memory 11a (see FIG. 1) as first video control data. Even when "Second" is selected at Step 111 of FIG. 3(a), "CONTRAST 2"=50 and "SHARPNESS 2"=50 are stored in the memory 11a as second video control data in the same way at Steps 113 and 115.

Even if such a memory operation of video control data ends, the information indicating the correspondence between the first and second video control data and the displaying forms shown in FIGS. 5(c) and 5(b) is stored temporarily in the internal memory of the micro computer 7 shown in FIG. 1.

Figure 3B:
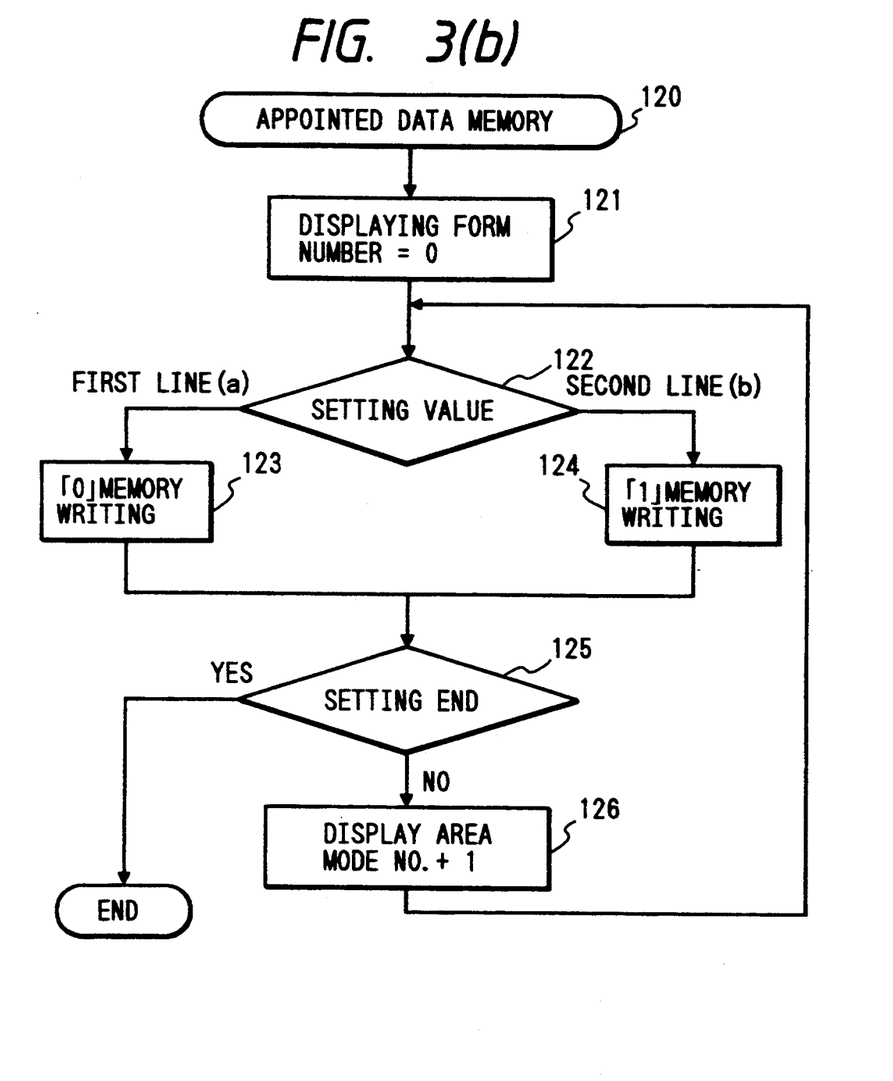

Next, the method of writing identification data into the memory 11b (shown in FIG. 1) will be explained with reference to FIG. 3 (b).

When the identification data writing mode is selected by operating the key switch 9 (shown in FIG. 1) or the remote controlled signal acceptor 8, the displaying form information 0 of FIG. 2(b) corresponding to the displaying form shown in FIG. 5(c) is set in the micro computer 7 of FIG. 1 at Step 121 of FIG. 3(b). Since the display form information is "0" the micro computer 7 at Step 122 determines that the identification data designates the second video control data group of FIG. 2(a), selects 'First Line (a)', and writes "0" in the memory 11b of FIG. 1 at Step 123. When continuation of the writing is instructed at Step 125 of FIG. 3(b), the micro computer 7 sets the information of the displaying form shown in FIG. 5(c) '1' at Step 126 and returns to Step 122. Next, the micro computer 7 at Step 122 selects 'Second Line (b)' of FIG. 3(b). Further and at Step 124 writes '1' in the memory 11b of FIG. 1 as identification data corresponding to the display form information 1 of FIG. 2(b). Upon completion of the 'Second Line (b)' processing, the identification data is stored in the memory 11b of FIG. 1 and the writing is terminated at Step 125 of FIG. 3 (b)) .

When video control data and identification data are stored in the memories 11a and 11b as described above, by selecting the display form shown in FIG. 5(b) or the display form shown in FIG. 5(c) upon operating the remote controlled signal acceptor 8 or the key switch 9 of FIG. 1, the micro computer 7 reads the video control data corresponding to the selected display form and controls the signal processing circuit 5 of FIG. 1 in accordance with the video control data. Next, reading of video control data from the memory 11a of FIG. 1 will be described with reference to FIG. 3(c).

It is assumed that the display form on the cathode-ray tube 6 when the receiver starts receiving an NTSC signal is the form shown in FIG. 5(b). If this occurs, the micro computer 7 retrieves the display form information '1' of FIG. 2(b), and reads from the memory 11b the identification data of '1' as shown in FIG. 2(b). In accordance with such identification data, the microcomputer then reads the first video control data group from the memory 11a as illustrated in FIG. 2(a). The micro computer 7 thereupon sets the characteristics of the signal processing circuit 5 in accordance with the video control data.

The signal processing circuit 5 has a means of correcting characteristics such as the sharpness and contrast of an image in the same way as with the conventional television receiver shown in FIG. 6. Such means is structured to vary the characteristics. For example, for contrast adjustment, although the characteristic curve is non-linear according to the amplitude of a video signal, the signal processing circuit can change the characteristic curve.

Figure 4:
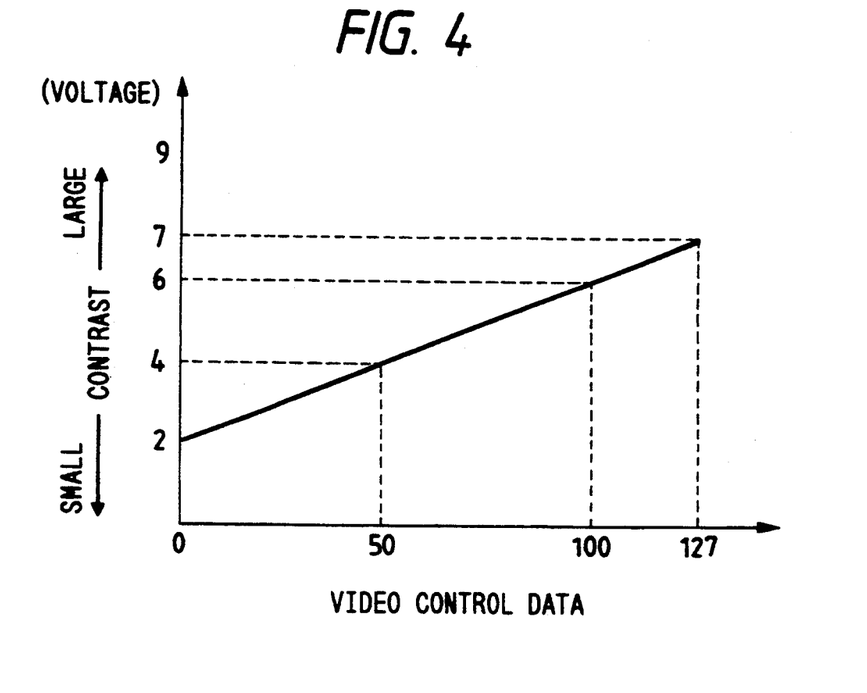
FIG. 4 is a characteristic diagram showing an example of the relationship between video control data and control voltage.

In the micro computer 7, a conversion characteristic of control voltage against video control data is set, for example, regarding the contrast as shown in FIG. 4. Where CONTRAST 2 is 50 as shown in FIG. 2(a), the micro computer 7 generates a contrast control voltage of 4 V as shown in FIG. 4. The control voltage is supplied to the contrast control terminal of the signal processing circuit 5. A contrast characteristic curve according to contrast control voltage of 4 V thereupon is set in the signal processing circuit 5 of FIG. 1. The same may be said with the sharpness.

Figure 3C:
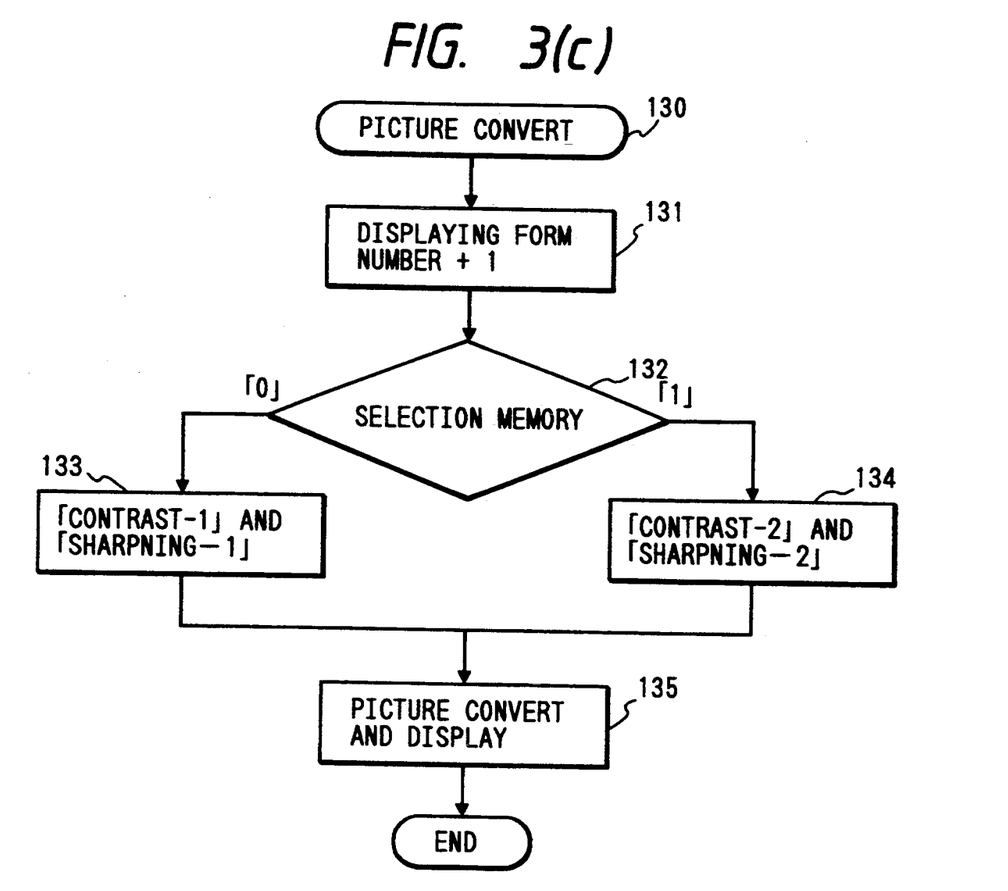

When the image display form is changed to the image display form of FIG. 5(b) by operating the remote controlled signal acceptor 8 or the key switch 9 of FIG. 1, the micro computer 7 enters a picture conversion operating mode at Step 130, and changes the display form information to be set from 0 to 1 adding 1 at Step 131 of FIG. 3(c). The micro computer then at Step 132 reads from the memory 11b of FIG. 1 the identification data corresponding to display form 1 as shown in FIG. 2(b), and in accordance with the identification data reads at Step 134 of FIG. 3(c) the first video control data group from the memory 11a.

Since CONTRAST 1 is 100 in the first video control data group of FIG. 2(a), for example, regarding the contrast, the micro computer 7 generates a contrast control voltage of 6 V from the conversion characteristic shown in FIG. 4, and supplies the control voltage to the contrast control terminal of the signal processing circuit 5. By doing this, in the signal processing circuit 5 of FIG. 1, a contrast characteristic curve set in accordance with a contrast control voltage of 6 V and the display form shown in FIG. 5(b) is changed to the display form shown in FIG. 5(c) at Step 135. The same may be said with the sharpness.

As mentioned above, simultaneously with the changing of the display form shown in FIG. 5(b) to the display form shown in FIG. 5(c), the characteristic curves of contrast and sharpness of the signal processing circuit 5 are changed. By setting these characteristic curves, and the relationship between video control data and control voltage suitably for each displaying form, a contrast and sharpness which are most suited to each image display can be obtained. In addition, the contrast and sharpness of images on the cathode-ray tube 6 can be kept unchanged.

If the image display form is changed as shown in FIG. 3(c) when the receiver is set for the display form shown in FIG. 5(c), a value of 1 is added to the display form information of FIG. 2(b) at Step 131 of FIG. 3(c), but the result will be 0 instead of 2 at Step 132. The micro computer 7 shown in FIG. 1 thus reads the identification data for display form information '0' from the memory 11b , and at Step 133 reads the second video control data group from the memory 11a. A contrast control voltage of 4 V then, is generated by the micro computer 7 as illustrated in FIG. 4, and a contrast characteristic curve and a sharpness characteristic curve are set according to the contrast control voltage in the signal processing circuit 5 of FIG. 1. The display form shown in FIG. 5(c) thereupon is changed to the display form shown in FIG. 5(b) at Step 135. Even in this case, the contrast and sharpness of images displayed on the cathode-ray tube 6 will not be changed.

As mentioned above, according to this embodiment, when the image display form is changed, the contrast and sharpness which are most suited to the new display image are automatically set. Therefore, the image quality will not be changed by changing the display form, and the video control settings can be saved.

In the above embodiment, only two types of video control data such as "contrast" and "sharpness" are handled. However, other types of video control data such as "tint", "color density", "black level", "white balance", and "vertical sharpness" can be considered. Furthermore, automatic changing of not only video control data but also voice control data such as "low tone", "high tone", "balance of left and right", and "loudness" can be considered.

The numerical values shown in the above embodiment are used only for convenience sake of explanation. The present invention is not limited to those numerical values. As mentioned above, according to the present invention, when the image display form is changed, an image quality which is most suited to the new display form can be obtained automatically. Therefore, any change in the image quality when the display form is changed is eliminated. The video control settings thus can be saved, and the receiver can be easily operated.

What is claimed is:

1. A television receiver including a display screen having a first aspect ratio, which comprises:
   front end tuning means responsive to first control signals for selecting video signals having a second aspect ratio;
   decoder means responsive to second control signals for decoding first information signals received from said front end tuning means;
   conversion circuit means responsive to third control signals for adjusting display dimensions of second information signals received from said decoder means in at least horizontal and vertical directions;
   signal processing circuit means responsive to fourth control signals for adjusting contrast and sharpness characteristics of third information signals received from said conversion circuit means;
   first memory storage means for storing video control data groups including contrast and sharpness data for at least one image display form;
   second memory storage means for storing group identification data for selecting a video control data group stored in said first memory storage means;
   image method selection means for supplying a selection signal to indicate one of plural image enhancement methods for maintaining video image quality; and
   control means in electrical communication with said first memory storage means and said second memory storage means, and responsive to said selection signal for generating said first control signals, said second control signals, said third control signals to identify to said conversion circuit means said one of said plural image enhancement methods, and said fourth control signals to issue video characteristic control signals to said signal processing circuit means.

2. The television set as described in claim 1 wherein said conversion circuit means comprises:
   a) non-interlace conversion circuit means receiving luminance and chrominance signals from said decoder means for producing non-interlace video signals;
   b) third memory storage means in electrical communication with said non-interlace conversion circuit means and receiving said non-interlace video signals for compressing the time base of said non-interlace video signals;
   c) fourth memory storage means in electrical communication with said non-interlace conversion circuit means for removing all but a central horizontal image display area from said non-interlace video signals and enlarging said central horizontal image display area in the vertical direction;
   d) digital interpolation filter means receiving a video signal output from said fourth memory storage means for interpolating said video signal output; and
   e) switch means in electrical communication with said non-interlace conversion circuit means, said third memory storage means and said digital interpolation filter means for selecting a video signal having an aspect ratio compatible with that of said display screen on which said video signal will be displayed.

3. The television set of claim 1 wherein said first aspect ratio is 16:9, said second aspect ratio is 4:3.

4. The television set of claim 2, wherein said first aspect ratio is 4:3, said second aspect ratio is 4:3, and said switch means selects an output of said third memory storage means.

5. The television set of claim 2, wherein said first aspect ratio is 4:3 and said second aspect ratio is 16:9, and said switch means selects an output of said non-interlace conversion circuit means.

6. The television set of claim 2, wherein said first aspect ratio is 16:9, said second aspect ratio is 4:3, and said switch means selects an output of said digital interpolation filter means.

7. A method for processing a video signal having a first aspect ratio achieve a faithful reproduction of a video image on a video display screen having a second aspect ratio, which comprises the steps:
   selecting one of plural image enhancement methods in dependence upon said first aspect ratio and said second aspect ratio;
   decoding said video signal in accordance with said one of said plural image enhancement methods to produce first luminance and chrominance signals;
   varying the characteristics of images defined by said first luminance and chrominance signals including time base, vertical height, and horizontal width in accordance with said one of said plural image enhancement methods to produce second luminance and chrominance signals;
   storing a separate video control data group for each of said plural image enhancement methods in a memory storage system, said separate video control data group having image characteristic data;
   accessing said memory storage system to retrieve one of said separate video control data groups in accordance with said one of said plural image enhancement methods;
   converting said image characteristic data into video control signals for controlling a video image display; and
   generating primary color signals from said second luminance and chrominance signals in response to said video control signals.

* * * * *